(No Model.) 2 Sheets—Sheet 1.
A. J. WHITTIER.
STREET SWEEPER.
No. 446,046. Patented Feb. 10, 1891.
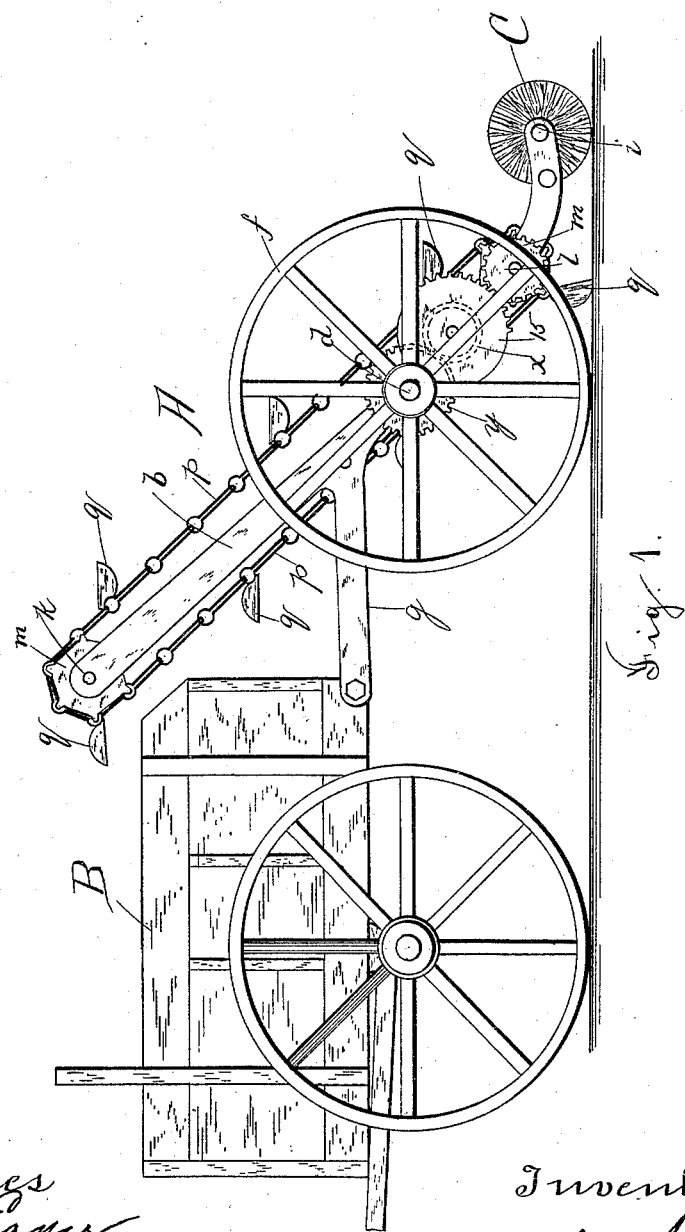

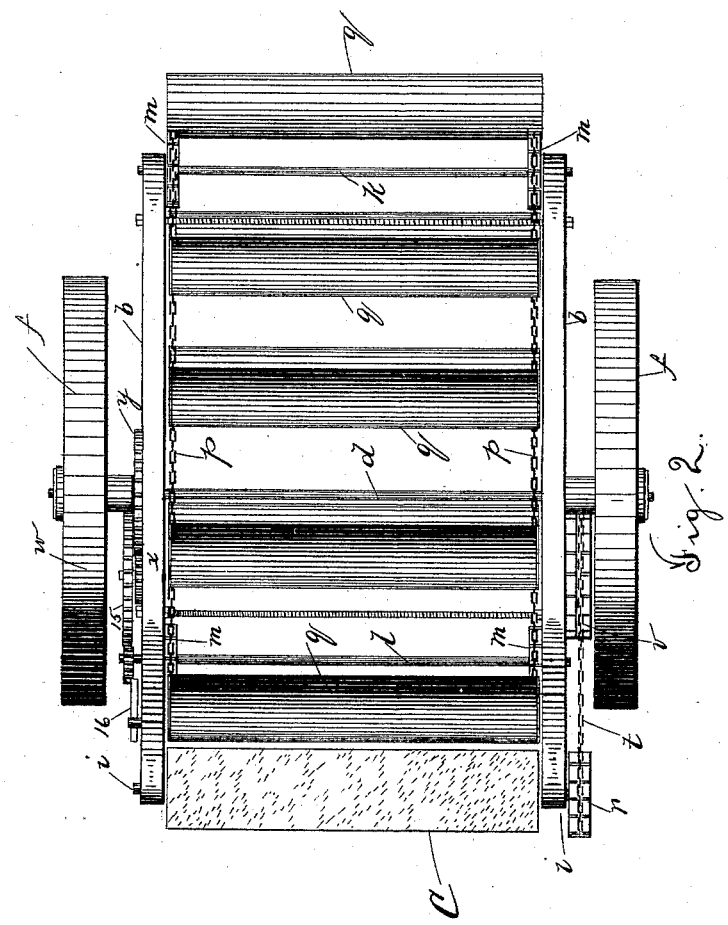

UNITED STATES PATENT OFFICE.

ALCIBIADES J. WHITTIER, OF CHELSEA, ASSIGNOR TO HIMSELF, AND JESSE M. GOVE AND ROBERT C. FANNING, BOTH OF EAST BOSTON, MASSACHUSETTS.

STREET-SWEEPER.

SPECIFICATION forming part of Letters Patent No. 446,046, dated February 10, 1891.

Application filed June 26, 1890. Serial No. 356,814. (No model.)

*To all whom it may concern:*

Be it known that I, ALCIBIADES J. WHITTIER, of Chelsea, in the county of Suffolk, State of Massachusetts, have invented certain new and useful Improvements in Street-Sweepers, of which the following is a description sufficiently full, clear, and exact to enable any person skilled in the art or science to which said invention appertains to make and use the same, reference being had to the accompanying drawings forming part of this specification, in which—

Figure 1 is a side elevation representing my improved sweeper in use; and Fig. 2, a top plan view of the sweeper detached from the cart.

Like letters and figures of reference indicate corresponding parts in the different figures of the drawings.

My invention relates especially to sweepers which are provided with traveling buckets for receiving the dirt or refuse matter as it is collected by the brush; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the frame of the sweeper, which consists of two side bars $b$, mounted on an axle $d$, supported by wheels $f$.

An arm $g$ is formed on each side bar for securing the sweeper to the rear of a cart B, in which position the upper ends of the side bars project over the cart. The lower ends of the side bars are curved (see Fig. 1,) and a horizontally-arranged rotary brush C is mounted on a shaft $i$ in said bars. A shaft $k$ is mounted in the upper ends of the side bars and a similar shaft $l$ in their lower ends near the brush. Sprocket-gears $m$ are mounted on these shafts and are connected by chains $p$. At intervals on the chains $p$ horizontally-arranged buckets $q$ are secured. A sprocket-gear $r$ is mounted on the brush-shaft $i$, and is connected by a chain $t$ with a similar gear $v$ on a shaft $w$ in the side bars. A pinion $x$ is mounted on the shaft $w$ and meshes with a gear $y$ on the axle $d$. A sector or partial gear $z$ on the shaft $w$ meshes with a pinion 15 on the shaft $l$. A click 16 on the side bar engages said pinion.

In the use of my improvement, the sweeper being secured to the cart B by its arms $g$, as described, and said cart set in motion, the axle $d$ rotates the shaft $w$ geared thereto. This sets in motion the brush-shaft $i$. The brush thereon rotating throws the dirt inward or in the direction of the line of motion. The gear 15 intermittently rotates the shaft $l$ and causes the buckets $q$ to travel. This movement is so timed that the brush C is permitted to collect a considerable quantity of dirt before a bucket $q$ advances to receive it. Said buckets coming nearly into contact with the brush readily receive the sweepings, which are carried thereby upward and discharged into the cart B, as said buckets pass over the upper sprockets $m$, in a manner which will be understood without a more explicit description.

Having thus explained my invention, what I claim is—

1. In a street-sweeper, a frame mounted on wheels, a rotary sweeper in said frame and driven from the axle, endless chains mounted on wheels in said frame and bearing a series of buckets, and mechanism actuated by the axle for intermittently moving said buckets, substantially as described.

2. In a street-sweeper, the combination of a frame mounted on an axle and provided with arms for attaching it to a cart, a rotary brush driven from said axle, shafts in said frame bearing sprocket wheels and chains, one of said shafts being intermittently rotated by a sector-gear driven by the axle, and buckets on said chains, arranged to operate substantially as described.

3. In a street-sweeper, a series of traveling buckets intermittently driven by the sweeper axle or wheels and adapted to receive sweepings from a rotary brush, substantially as described.

4. The frame A, mounted on wheels $f$, in combination with the brush C, the chains $p$, traveling in said frame and bearing buckets $q$, and mechanism driven by the wheel-axle for conjointly rotating said brush and intermittently actuating said chains, substantially as described.

ALCIBIADES J. WHITTIER.

Witnesses:
 R. S. WHITTIER,
 M. C. STEADS.